United States Patent [19]

Brinkmeyer et al.

[11] Patent Number: 5,708,712
[45] Date of Patent: Jan. 13, 1998

[54] VEHICLE SECURITY DEVICE WITH ELECTRONIC USE AUTHORIZATION CODING

[75] Inventors: Horst Brinkmeyer, Waiblingen; Michael Daiss, Filderstadt; Günter Schwegler, Weinstadt; Bertolt Krüger, Bonn, all of Germany

[73] Assignee: Mercedes-Benz AG, Germany

[21] Appl. No.: 415,377

[22] Filed: Apr. 3, 1995

[30] Foreign Application Priority Data

Apr. 1, 1994 [DE] Germany .................. 44 11 450.8

[51] Int. Cl.$^6$ .............. H04L 9/00; E05B 49/00
[52] U.S. Cl. ............. 380/23; 380/49; 380/25; 340/825.31; 340/825.34
[58] Field of Search .................. 380/23, 25, 49, 380/28, 30; 340/825.31, 825.34

[56] References Cited

U.S. PATENT DOCUMENTS

| | | | |
|---|---|---|---|
| 4,392,133 | 7/1983 | Lundgren | 340/825.31 |
| 4,405,829 | 9/1983 | Rivest et al. | 380/30 |
| 4,509,093 | 4/1985 | Stellberger | 360/172 |
| 4,736,419 | 4/1988 | Roe | 380/3 |
| 4,786,900 | 11/1988 | Karasawa et al. | 340/825.31 |
| 4,928,098 | 5/1990 | Dannhaeuser | 340/825.56 |
| 4,992,785 | 2/1991 | Lewiner et al. | 340/825.34 |
| 5,146,215 | 9/1992 | Drori | 340/825.32 |
| 5,191,610 | 3/1993 | Hill | 380/21 |
| 5,253,295 | 10/1993 | Saada et al. | 380/23 |
| 5,365,225 | 11/1994 | Bachhuber | 340/825.31 |
| 5,369,706 | 11/1994 | Latka | 380/23 |
| 5,377,270 | 12/1994 | Koopman, Jr. et al. | 380/25 |
| 5,479,154 | 12/1995 | Wolfram | 340/825.31 |
| 5,508,687 | 4/1996 | Gebhardt et al. | 340/825.31 |
| 5,508,692 | 4/1996 | Wolfram | 340/825.31 |
| 5,561,420 | 10/1996 | Kleefeldt et al. | 340/825.31 |

FOREIGN PATENT DOCUMENTS

| | | | |
|---|---|---|---|
| 29 11 828A1 | 10/1980 | Germany | E05B 65/36 |
| 32 25 754A1 | 7/1982 | Germany | E05B 47/00 |
| 32 25 754 | 1/1984 | Germany | E05B 49/00 |
| 32 34 539A1 | 3/1984 | Germany | E05B 49/00 |
| 33 13 098C1 | 10/1984 | Germany | E05B 49/00 |
| 44 11 449 | 3/1995 | Germany | B60R 25/00 |

OTHER PUBLICATIONS

Bruce Schneier, "Applied Cryptography" 2nd edition John Wiley and Sons, N.Y. 1995 pp. 53–54.

"Password Authentication with Insecure Communication", Communications of the ACM, Nov. 1981, vol. 24, No. 11, Leslie Lamport.

"A Dynamic Password Authientication nMethod Using a One–Way Function", Systems and Computers in Japan, 1991, vol. 22, No. 7, A. Shimuzu.

French Search Report dated Feb. 28, 1997.

"Diebstahlschutz Für das Auto" [Protecting Cars Against Theft] from Temic Telefunken microelektronik GmbH dated Aug. 1993.

(List continued on next page.)

*Primary Examiner*—Thomas H. Tarcza
*Assistant Examiner*—Pinchus M. Laufer
*Attorney, Agent, or Firm*—Evenson, McKeown, Edwards & Lenahan, P.L.L.C.

[57] ABSTRACT

The invention provides a vehicle security device utilizing a rapid encryption method which operates on the basis of a "one-way function" and which requires storage in the vehicle of at most one item of secret coded information in a single piece of equipment, out of any desired number of pieces of equipment involved in vehicle security. In all such pieces of equipment only the one-way function values corresponding to inverse images stored in a key unit need to be present, the reading out of the said one-way function values making unauthorized manufacture of a copied key impossible. Security against interception and storage of information transmitted at the key end in order to produce copied keys is ensured by including an item of random information, transmitted at the vehicle end, in this authentication information.

14 Claims, 4 Drawing Sheets

OTHER PUBLICATIONS

"A Method for Obtaining Digital Signatures and Public Key Cryptosystems," R. L. Rivest et al., Communications of the ACM, Feb. 1978, pp. 120–126.

"RIPE Integrity Primitives Part I, Final Report of RACE 1040," RIPE Consortium, Report CS-R9324 Apr. 1993. Cover Sheet.

Part III Recommended Integrity Primitives, Chapter 3 RIP-EMD, pp. 67–90.

Part III Recommended Integrity Primitives, Chapter 7 RSA, pp. 174–190.

VEHICLE SECURITY DEVICE WITH ELECTRONIC USE AUTHORIZATION CODING

BACKGROUND AND SUMMARY OF THE INVENTION

The invention relates to a vehicle security device with electronic use authorization coding by means of bidirectional exchange of data between a key unit and a vehicle unit during use authorization tests.

Vehicle security devices which utilize unidirectional data transmission for use authorization testing, exclusively from the key unit to the vehicle unit, are known. These include, for example, electronic disabling facilities which operate according to a so-called alternating code method for protecting the vehicle against unauthorized use by a third party. See, for example, the company brochure "Diebstahlschutz f ür das Auto" [Protecting cars against theft] from TEMIC TELEFUNKEN microelektronik GmbH dated August 1993.

In contrast to fixed code methods which were customary in the past, as described for example in the German Patent Document DE-OS 29 11 828 A1, in such alternating code methods, enhanced protection against unauthorized use of the vehicle after one or more of the code transmission protocols have been intercepted can be achieved by changing the code information at each so-called authentication process, i.e. at each testing process of the use authorization. This code change can be realized only from the key unit to the vehicle unit in compliance with the unidirectional code information transmission known from the fixed code method, by using a secret item of base counting information and an algorithm stored both at the key unit and at the vehicle unit. By means of the algorithm, successive items of code information can be derived from the base number, so that at the vehicle unit the user authorization can be tested by comparing the code information produced at the vehicle unit with the code information transmitted at the key unit. Alternatively, it is known to provide both the key unit and vehicle unit with a new, randomly selected or deterministically specified authorizing item of code information for the next authentication, after each successful authentication by controlled synchronization. See, for example, the German Patent Document DE-OS 32 34 539 A1 and the patent document DE 33 13 098 C1.

As with many bidirectionally operating systems, protection systems with only unidirectional data transmission have the following weak point. If an authorized user temporarily gives his key unit to another person, for example for his vehicle to be parked during a stay at a hotel, this other person can easily produce a copy of the key by reading out the information stored in the key and storing it, after which this person returns the key unit to the authorized user. Before the authorized user himself uses the car again, another person can authenticate himself with the vehicle in an unauthorized way using the copied key, and subsequently use the vehicle without authorization. This manner of taking possession of the car without authorization may also be more difficult to prove than directly stealing the key. Such an attempt at stealing a vehicle can be counteracted within the scope of a code protection system by using a bidirectional exchange of data for the authentication, in which exchange an item of information which cannot be predicted by an external party is transmitted from the vehicle unit to the key unit, and is included in the authentication information which is transmitted back from the key unit.

Vehicle security systems of the type mentioned above in the form of so-called symmetrical encryption methods are already known, in which the authentication takes place by means of bidirectional data exchange. For this purpose, an identical secret coding algorithm is stored at the key unit and at the vehicle unit. This algorithm produces an item of code information in response to an item of input information, e.g. an item of random counting information, fed to both ends. The item of code information at the key unit is subsequently transmitted to the vehicle unit and tested there for correspondence with the item of code information produced at the vehicle unit. A method of this type is described in the German Patent Document DE-OS 32 25 754 A1.

Consequently, all the known methods described above require the storage of an item of secret information at the vehicle unit in all pieces of equipment involved in the authentication. This requires a corresponding logistical security outlay for the provision of such secret data at the vehicle manufacturing plant, at the component manufacturing plant and/or at garages in which this secret vehicle-specific information is to be provided in replacement pieces of equipment.

One object of the present invention is to provide a vehicle security device of the type mentioned above which requires a relatively low outlay and the lowest possible degree of secret information storage in the vehicle unit, is convenient to operate, and provides a relatively high degree of protection against unauthorized use of the vehicle by third parties. Another object of the invention is to provide a vehicle security device in which it is impossible for an unauthorized person, simply by intercepting and storing information transmitted during authentication attempts, subsequently to use the vehicle in an unauthorized way by the simple means of successful authentication utilizing the intercepted information.

The vehicle security device according to the invention offers a relatively high degree of protection against unauthorized use of the vehicle by third parties accompanied by a comparatively low outlay. At most one item of secret information must be stored in a single piece of equipment at the vehicle unit, which keeps the logistical security outlay by the vehicle manufacturer and at garages, and the associated security risks very low. The system offers in particular the security that copied keys, with which subsequent successful authentication would be possible, cannot be produced by intercepting authentication information transmitted during authentication attempts, since the user code information transmitted at the key unit depends, during each authentication attempt, on a random item of information previously transmitted at the vehicle unit. Moreover, a number of essential pieces of equipment may be involved in the authentication at the vehicle unit, making it impossible to bypass the vehicle disabling facility simply by replacing one or a small number of pieces of equipment. Replacement of all pieces of equipment which are involved in authentication, on the other hand, would be uneconomic. This refinement does not substantially increase the outlay for logistical security, however.

The code security of the authentication according to the invention is based on the inherent definitional property of a mathematical "one-way function". A one-way function is defined here as a mathematical function for which the function value associated with a given inverse image can be determined unambiguously and comparatively easily from its domain, while it is not possible, even with the maximum practically available computational effort, to find an inverse image for a given one-way function value. (In mathematics, the term "inverse image" refers to a set of input values used to generate an associated set of function values by means of a function f. If $y_1=f(x_1)$, then a value $x_1$, associated with a particular function value $y_1$, may be referred to as the inverse image of $y_1$. That is $x_1=f^{-1}(y_1)$.) Thus, the algorithm for calculating a one-way function value associated with an inverse image is comparatively simple, but on the other hand the calculation of an inverse image which is associated with a given value of a one-way function is not possible within an available time period and a practically realizable computational outlay.

The latter proposition, of course, depends largely on the computer capacity available. Known one-way functions (e.g. in the form of so-called hash functions) are used principally for protecting messages in cryptography. At the current state of computer technology, the upper limit of computational outlays which can be practically coped with is approximately $2^{56}$ calculation and memory processes of hash values.

The hash function, sometimes called a message-digest algorithm, compresses messages of arbitrary length to a 128-bit output block, that is called the fingerprint hashcode, hash value or message-digest of the message. It is regarded as computationally infeasible to produce two messages having the same hashcode, or to produce any messages having a given prespecified target hashcode. Hash functions with these properties are known and used in message authentication applications such as the protection of the integrity and the origin of data stored or transmitted using secret-key or public-key techniques.

Because of the virtual irreversibility of one-way function, the one-way function values at the vehicle unit do not have to be treated as secret, since even unauthorized reading out of such values from the vehicle would not permit an unauthorized person to discover the associated inverse images and produce an electronic copy of the key. The security of the system is also provided by the fact that a new item of inverse image code information is transmitted for each authentication attempt. Depending on the result of the comparison of actual and desired authorization information, the authentication unit in the vehicle outputs an item of use-enabling information which in the case of a positive (successful) authentication attempt leads to an associated electronic disabling facility being deactivated, and in the case of a negative (unsuccessful) authentication attempt causes it to remain activated. In the latter case, the electronic disabling facility ensures that after the ignition key is withdrawn, at least one piece of equipment which is in the vehicle and is required for access to the vehicle or for the operation of the vehicle (for example, a locking control, an engine control device etc.) remains disabled.

One embodiment of the invention forms a sequence of inverse images, which are stored at the key unit, in an advantageous, simple manner by successively executing the one-way function, after which the sequence is read out backwards during operation of the key; that is, the last inverse image to be determined becomes the initial one. At the vehicle unit, this arrangement provides the technical advantage in terms of memory that not all the one-way function values associated with the inverse images must be stored. Instead, the initial storage of the one-way function value which is associated with the first inverse image transmitted is sufficient to provide the desired authorization information, after which, whenever there is a successful authentication using the same key unit, the stored information is overwritten with the inverse image transmitted for this authentication. This is possible because a previously transmitted inverse image is always in fact the one-way function value of the inverse image transmitted subsequently.

In another embodiment of the invention, memory space is saved at the key unit in that not all the inverse images required over the service life of the key unit are stored, but rather samples at selected intervals of the entire sequence of inverse images, and a current range of values between two samples. Whenever a current range has been used up, the one-way function algorithm stored at the key unit can be used to generate and store a new current range starting from the next sample by recursive application of the one-way function.

In still another embodiment of the invention, a so-called capture range is set at the vehicle unit which makes it possible to synchronize the vehicle unit with the key unit again in the event that synchronization is lost as a result of one or more transmission activities at the key unit which were not received at the vehicle unit. If the one-way function value of a received inverse image as actual authorization information does not correspond to the instantaneous vehicle-end desired authorization information, the capture range permits a recursive one-way function formation to be executed for a prescribed maximum number of repetitions. In this process, the one-way function value which is produced each time from the previous actual authorization information serves as new actual authorization information. If correspondence between the desired authorization information stored at the vehicle unit, and the actual authorization information which has been newly determined in this way, is detected within the number of repetitions permitted by the capture range, this is evaluated as a positive authentication attempt. The disabling facility is then deactivated, and the transmitted inverse image information is stored as new desired authorization information for the next authentication attempt with this key. If the capture range is selected to be as large as the power of the total inverse image sequence possible in the key unit, this additionally permits an authorizing replacement key to be incorporated into the system in an advantageously simple way, while simultaneously the replaced key automatically becomes invalid. For this purpose, according to yet another embodiment of the invention, the replacement key is preferably initialized by means of a single secret starting value stored in a central key processing facility for the formation of one-way function values for the initiation of the first key and of all further keys which replace the previous key successively as required.

Still another embodiment of the invention uses one of the hash functions known from cryptography, specifically the RIPEMD algorithm, which, according to the current state of cryptography, can be assumed to have the required one-way function properties.

In a further embodiment of the invention, a plurality of pieces of equipment at the vehicle unit are involved in parallel in the authentication, for which purpose they are advantageously connected via a common data bus. This decentralized distribution of authentication, which can extend over all the vehicle relevant pieces of equipment, makes bypassing the disabling facility (by replacing equipment) substantially more difficult, since all of the pieces of equipment affected by the authentication and the disabling facility would then have to be replaced in order to make it possible for the vehicle to be used by an unauthorized person who does not have the means of achieving successful authentication. The pieces of equipment involved, in particular control devices for the electronic systems of the vehicle, can be selected here to be such that replacing them would require an unreasonably high outlay in relation to the benefit gained, and would therefore be unattractive.

In another embodiment of the invention, locking control of the vehicle is included in the authentication so that not only is it impossible to start the vehicle without authorized autventication, it cannot even be opened without violence. If further pieces of equipment are involved, they may be connected to one another and to the locking control, for example, by means of a data bus. A single vehicle-end receiver for the data transmitted at the key unit is then sufficient, it being possible for the receiver to be assigned for example to the locking control.

Still another embodiment of the invention has the advantage that in the initial identification testing of the vehicle and the key, it is determined whether legitimized hardware units are connected to one another before the actual authentication process is carried out. In this manner, unnecessary activation of authentication operations, which cannot succeed because of an incorrect key/vehicle combination, are avoided.

A further embodiment of the invention permits the use of multiple keys for the vehicle in a manner which is advantageous for circuit technology, and still maintains the one-way function coding algorithm.

Another embodiment of the invention has the advantage that the functions which are not directly associated with the actual authentication process are provided only centrally at the vehicle unit in one piece of equipment (e.g. a locking control device), while the authenticating functions are arranged in each control device in order to provide a high degree of disabling protection.

A particularly advantageous embodiment of the invention uses coded logic linking of inverse image information and random information to provide a high degree of protection against misuse with a relatively low outlay in terms of coding. The use of random information ensures that an old (possibly intercepted) item of user code information cannot lead to successful authentication. By using an ongoing counter value, it is ensured that the hash function value, to which the respective inverse image is linked by an exclusive-OR operation, is not repeated if the random information were to be repeated by an unauthorized person. Use of a single item of secret information stored in only one vehicle-end piece of equipment still appears acceptable from the viewpoint of security logistics, and ensures that an external party cannot calculate the hash function value, which is linked to the inverse image by an exclusive-OR operation, without possession of the key unit. At the same time of course it must not be possible to read out the item of secret information (e.g. from an EEPROM of the key unit or piece of equipment) with an acceptable degree of outlay. Thus, this connection algorithm provides a reliable protection with a comparatively low computational outlay and requirement of memory location.

The algorithm selected in a final embodiment of the invention to generate random numbers ensures the unpredictability of the next random number for an external party, since the input values for the hash function during the generation of random numbers cannot be repeated predictably. Overall, the result is that unauthorized authentication by manipulation of the transmission link between key unit and vehicle unit, either by falsifying transmitted authentication information or by feeding in earlier, intercepted authentication information, cannot be successful with any significant degree of probability.

Other objects, advantages and novel features of the present invention will become apparent from the following detailed description of the invention when considered in conjunction with the accompanying drawings.

DETAILED DESCRIPTION OF THE DRAWING

Figure 1:
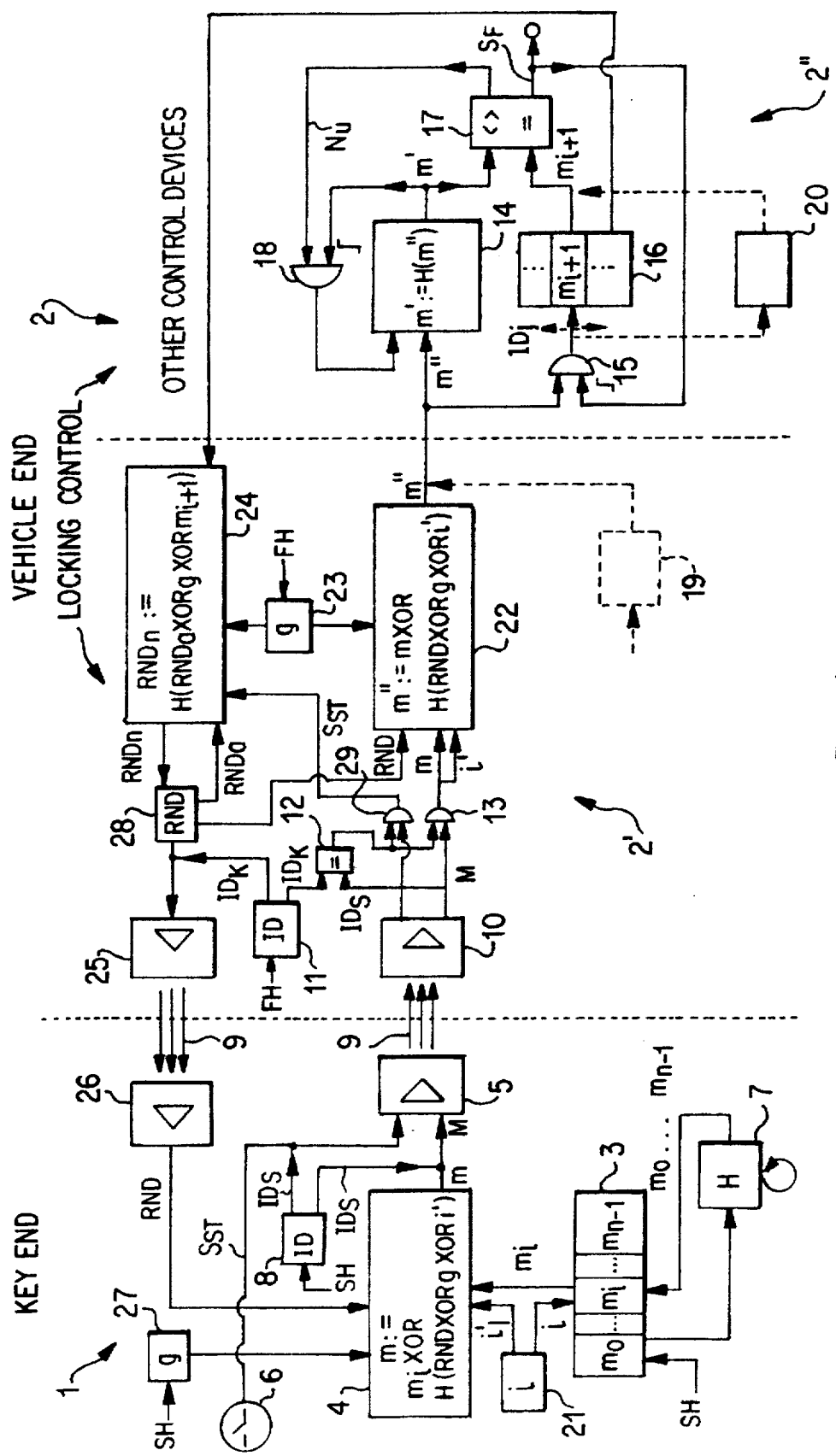
FIG. 1 shows a block diagram of a vehicle security device according to a preferred embodiment of the invention, with electronic use authorization testing by means of bidirectional code exchange.

The vehicle security device according to the invention contains at the user end a plurality of, e.g. eight, electronic keys (1), one of which is shown by way of example, and at the vehicle unit a plurality of pieces of equipment (2) which are involved in protecting vehicle use. One of these pieces of equipment is a locking control which is illustrated as representative of the other pieces of equipment in the figure, while the other pieces of equipment are the other control devices of the vehicle's electrical system. Here, the circuit component (2') (illustrated in the figure at the vehicle unit, between the dotted dividing lines) is present only in the locking control, while the circuit component (2") which is located to the right of this dividing line is present in an identical form for all the pieces of equipment involved. All the pieces of equipment (2) involved in protection communicate with one another and with the receiver-end circuit component (2') present only in the locking control, via a CAN bus or alternatively via another data exchange link in the vehicle (not shown). The key units and pieces of equipment (1, 2) each are equipped with a processor chip in which the function units which are each illustrated in block form in the figure and described below, are implemented largely by means of software.

Each of the key units (1) has a transmitter (5) by which data can be transmitted in coded form to the vehicle via an infrared link (9) where they are received and subsequently decoded by a receiver (10) in the input circuit component (2') of the locking control (2). In addition, each key unit also has a receiver (26) for receiving a random item of information (RND) which can be output via a transmitter (25) in the locking control. Furthermore, each key unit (1) has a unit (7) for the recursive generation, in a known manner, of one-way function values of a hash function (H) used, for example, in cryptography. In one embodiment, for example, the RIPEMD function, a well known example of a hash function ("Ripe Integrity Primitives, Final report of RACE Integrity Primitives Evaluation (R1040) (June 1992), Part III Recommended Integrity Primitives, Chapter 3 RIPEMD, pp. 67–109"), is used specifically as a hash one-way function.

The bit length of a RIPEMD function value is 16 bytes; however, it is sufficient for the present purpose of providing vehicle security to transform the 16 byte value into a shortened 8 byte value by means of a suitable algorithm in order to save memory space. With this hash function value generating unit (7), a number n of values are produced by repeated application of the hash function, starting with a starting value ($m_0$), and stored as inverse images in an inverse image memory (3) which can be read out backwards, i.e. starting with the last value ($m_{n-1}$) of the inverse image sequence ($m_0, \ldots, m_{n-1}$) successively, into a coding stage (4) by means of a display counter (21). The number n determines the number of authentication attempts which can be triggered by the key unit (1) during its service life, and is to be selected appropriately, for example n=100,000 for approximately 20 activations per key per day with a service life of the key of approximately 10 years.

Furthermore, an item of secret information (g) which is stored in a memory (27), can be fed to the coding stage (4), together with the received random information (RND) and a running count value (i') of the counter (21). This input information is then linked by means of exclusive-OR logic operations and the formation of hash function values, according to the relation:

$$m := m_i \text{ XOR } H \text{ (RND XOR g XOR i')}$$

to form an item of coded inverse image information value (m).

In order to store hardware identification data which comprise a vehicle-specific and a key-specific item of information, each key unit (1) has an identification data memory (8) whose data is combined by the key unit (1) with the coded inverse image information (m) originating from the coding stage (4) to form the user code information (M) to be transmitted as a message.

In order to initiate an authentication, a user key (6) is provided whose starting signal (SST) can be transmitted to the vehicle locking control (2).

At the vehicle unit the information input-end circuit component (2') of the locking control (2) contains an identification data memory (11), an identification data comparator (12) and a gate function (13). The comparator (12) compares the identification data ($ID_x$) extracted in this locking control device circuit component (2') from the received user code information (M) with the identification data information ($ID_K$) stored in the vehicle-end identification data memory (11), and supplies its output signal to a control input of the gate (13) whose other input is supplied with the user code information signal (m). Optionally, a diagnostic interface (19) can be connected to the locking control (2), as indicated in the figure by dotted lines.

In addition, this locking control circuit component (2') contains a memory (23) in which the secret information (g) is stored, a decoding unit (22), a random information generator (24), a random information memory (28) and a gate (29) for permitting the starting signal ($S_{ST}$) to pass through to the random information generator unit (24). Decoding takes place here in a way which accords with the coding in the key unit (1), according to the relation:

$$m'' := m \text{ XOR } H \text{ (RND XOR g XOR i')},$$

and the random information generator (24) produces a new item of random information ($RND_n$) according to the relation:

$$RND_n := H(RND_a \text{ XOR g XOR } m_{i+1}).$$

from a previous item of random information ($RND_a$), the secret information (g) and an inverse image ($m_{i+1}$) transmitted during a preceding authentication by exclusive-OR logic operations and forming hash function values.

The locking control circuit component (2"), which is shown in the figure to the right of both of the dotted dividing lines, is also present in identical form in all the other pieces of equipment (2) involved in the vehicle security system. It contains (again in the form of software) a unit (14) for calculating hash function values and a gate function (15), to both of which the inverse image information ($m_i$) contained in the user code information (M) is fed. The output of this gate (15) is connected to a desired authorization information memory (16) with a number of memory locations corresponding to the number of key units (1), the individual memory locations being capable of responding in dependence on the detected key identity ($ID_j$), i.e. the key number. The output of this memory (16) is in turn connected to an input of a comparator block (17) to which the output signal (m') of the hash function value generating unit (14) can be fed via a further input. This output signal (m') is also fed to a further gate (18) whose control input is supplied with a noncorrespondence signal ($N_u$) of the comparator (17).

When correspondence is detected, the comparator (17) generates a use-enabling signal ($S_F$) to cancel a state which blocks the operational capability of the software of the respective piece of equipment (2) and is part of an electronic disabling facility which keeps all these pieces of equipment disabled. The use-enabling signal ($S_F$), which represents successful authentication (i.e. use authorization testing) does not leave the associated piece of equipment and preferably does not even leave the chip area, which provides a high degree of security against unauthorized external feeding in of the use-enabling information. It is also fed as control signal to the gate block (15), which is supplied with the transmitted inverse image information ($m_i$), in order to permit this information to be stored as new desired authorization information.

In order to carry out special functions via the diagnostic interface (19), possibly connected to the locking control or a key unit (1), an additional desired authorization information memory (20) for special functions may be provided when required, parallel to the normal desired authorization information memory (16), as indicated by broken lines in the figure.

As mentioned above, all the pieces of equipment (2) involved in the authentication process are simultaneously also involved in an electronic disabling facility which is activated by switching off the ignition, and can be deactivated again by a subsequent successful authentication process. Since the same authentication operations are carried out in all these pieces of equipment (2), all such units (2) become operational again simultaneously in the event of an authorized request for use, while in the event of an unauthorized request for use at least one remains disabled. The distribution of the authentication process to all these pieces of vehicle equipment and the corresponding disabling of the same has the advantage that the vehicle cannot continue to be used simply by replacing one or a small number of pieces of equipment by bypassing the necessity for authentication. Instead, all these pieces of equipment would have to be replaced, which would be so expensive that such an attempt at unauthorized use by a third party would be unattractive.

Details are given below on the mode of operation of the vehicle security device constructed as described above.

The entire sequence begins initially before the vehicle is started up with the necessary initialization processes at the key manufacturer or a central key processing facility (SH) designed for this purpose. A secret random value ($r_0$) is initially produced for each key on an individual basis. The secret inverse starting value ($m_0$) is then calculated from this random value ($r_0$) by multiple (e.g. 400,000) successive application of the hash function, and fed into the inverse image memory (3) in the key unit (1). The initially unused hash function values between the secret initial random value ($r_0$) and the inverse starting value ($m_0$) can serve as resources for a key replacement (described further below), for which purpose the associated initial random value ($r_0$) is stored in a protected memory of the central key processing facility (SH).

Figure 2:
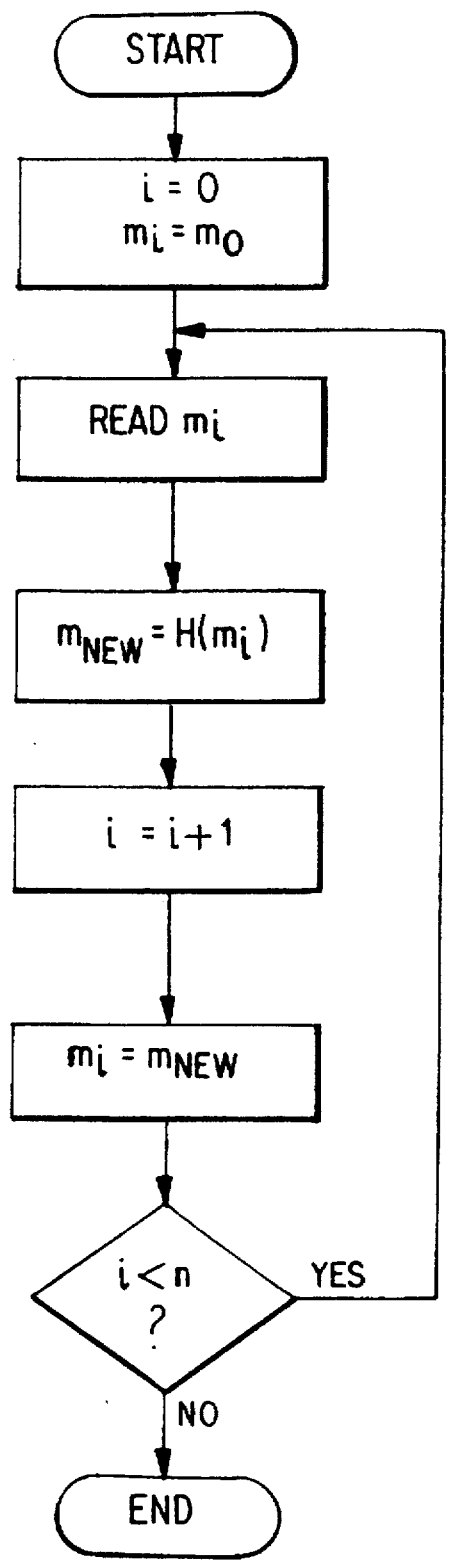
FIG. 2 is a flow chart which shows the process for recursive generation of inverse image values used for authentication according to the invention.

In addition to the inverse starting value ($m_0$), during the production of the key unit (1) the identification data ($ID_s$) are also fed into the associated memory (8). These data also contain, in addition to vehicle-specific data, a key number which distinguishes the respective key units which are simultaneously valid for one vehicle. With the exception of the key number, the identification data of the key units (1) which are simultaneously valid for one vehicle are identical and consequently form a kind of key set number. In parallel with this, the identical identification data are made available by the central key processing facility (SH) to be fed into the associated memory (11) of the locking control. In addition, during initialization at the central key processing facility (SH) n recursive hash function values ($H^J(m_0)$; J=1, ..., n-1) were all calculated in advance in the manner shown in FIG. 2, starting from the inverse starting value ($m_0$), and the final value ($m_n$) is passed on (as discussed below). This value $m_n$ is then used, together with the identification data to the manufacturer of the vehicle, as a key-specific starting value of the desired authorization information, for vehicle-end initialization of the associated memory location of the respective desired authorization information memories (16). Furthermore, during the production of keys, the vehicle-specific secret information (g) is fed in with anti-readout protection and also made available to the manufacturer (FH) of the vehicle to be input into the locking control device (2).

Using the initialization data received from the central key processing facility (SH), vehicle-end initialization is also carried out by the manufacturer of the vehicle. For this purpose, a vehicle-specific hash function value, which is part of a hash function value sequence also generated in the central key processing facility (SH), is fed into the special hash function value memory (20), specifically depending on the security requirement to terminate production at the vehicle manufacturer or during the installation of the equipment on the production line or in a garage. In order to initialize the desired authorization information memory (16), in the course of production each memory location, assigned to a specific key unit (1), of these memories (16) of all the involved pieces of equipment (2) are loaded with the starting value ($m_n$) which is made available for this purpose on a key-specific basis by the central key processing facility (SH). For this purpose, the operator must obtain authorization via the diagnostic interface (19) and the hash function value which is stored in the special function memory (20) on a vehicle-specific basis, before the operator can form the first initialization by overwriting the initial value zero with the key-specific initial value ($m_n$) of the desired authorization information. (The memory locations of the desired authorization information memories (16) are protected against normal overwriting as long as they contain the value zero.)

The special function memory (20) serves here as transport protection for the pieces of equipment but, depending on requirements, may permit further special functions to be carried out. During equipment initialization it must be ensured that the zero values of all the memory locations for the different keys of one set are overwritten in order to prevent later unauthorized initialization by third parties. Alternatively, it is possible to pass on the starting value ($m_n$) of desired authorization information to the vehicle unit for initialization when a first key actuation occurs.

If a piece of equipment (2) which is involved in the process is replaced during repairs there may additionally be provision to initialize the newly inserted unit with the starting values which are present in the other units by means of the CAN (Cylic Access Network) bus, which automatically ensures that all the starting values are overwritten to zero. In order to distinguish whether the information (M) which is fed to a piece of equipment (2) contains a normal authentication or a special function operation, the fed-in information (M) has, in addition to the identification data which comprise approximately 8 bytes and the inverse image information which is shortened to 8 bytes, additionally a coded mode signal for which a data length of 1 byte is sufficient.

After initialization has taken place, each key unit (1) generates with the first connection to the power supply the other n-1 values, via its hash function value generating unit (7) from the stored starting value ($m_0$) by repeated application of the hash function (n-1-times) to the respective function value previously obtained, and stores the obtained value sequence as an inverse image sequence in the appropriate memory (3) for successive reading out backwards, the associated counter (21) being initially set to the value n-1 and being reduced by one each time the activation key (6) is actuated.

Since the storage of these for example 100,000 16-byte values requires appropriate space, the following, memory spacesaving alternative process is possible. Selected values of the generated hash function value sequence ($m_0$ to $m_{n-1}$) (for example, only every hundredth value) are permanently stored in the memory (3) as samples. Also, the currently used section of the value sequence ($m_0$ to $m_{n-1}$) between two samples (which consists e.g. of 100 values in each case) is stored in the memory (3) so that in this way at any time only 1100 8-byte values have to be stored in the memory (3). As soon as the end of an instantaneous value sequence section is reached as a result of ongoing use of the key, the formation (7) of hash function values is activated with the next sample as input information in order to generate the next value sequence section between two samples, after which the used-up value sequence section is overwritten with the newly calculated one.

From the point of view of low memory requirement, a uniform memory distribution for the samples and for the region between two samples is even better. In that case, each memory component then contains the number of memory locations which corresponds approximately to the root of the power (n) of the entire value sequence ($m_0$ to $m_{n-1}$). In order to make the memory requirement as low as possible it is alternatively possible to store only the initial value ($m_0$), and to carry out again a repeated formation of hash function values starting from this starting value ($m_0$) after each activation of the key and to repeat this formation successively one time less in each case and then to feed the respective final value directly into the buffer (4). Other distributions are, of course, (e.g. logarithmic sample selection) equally possible.

Figure 3A:
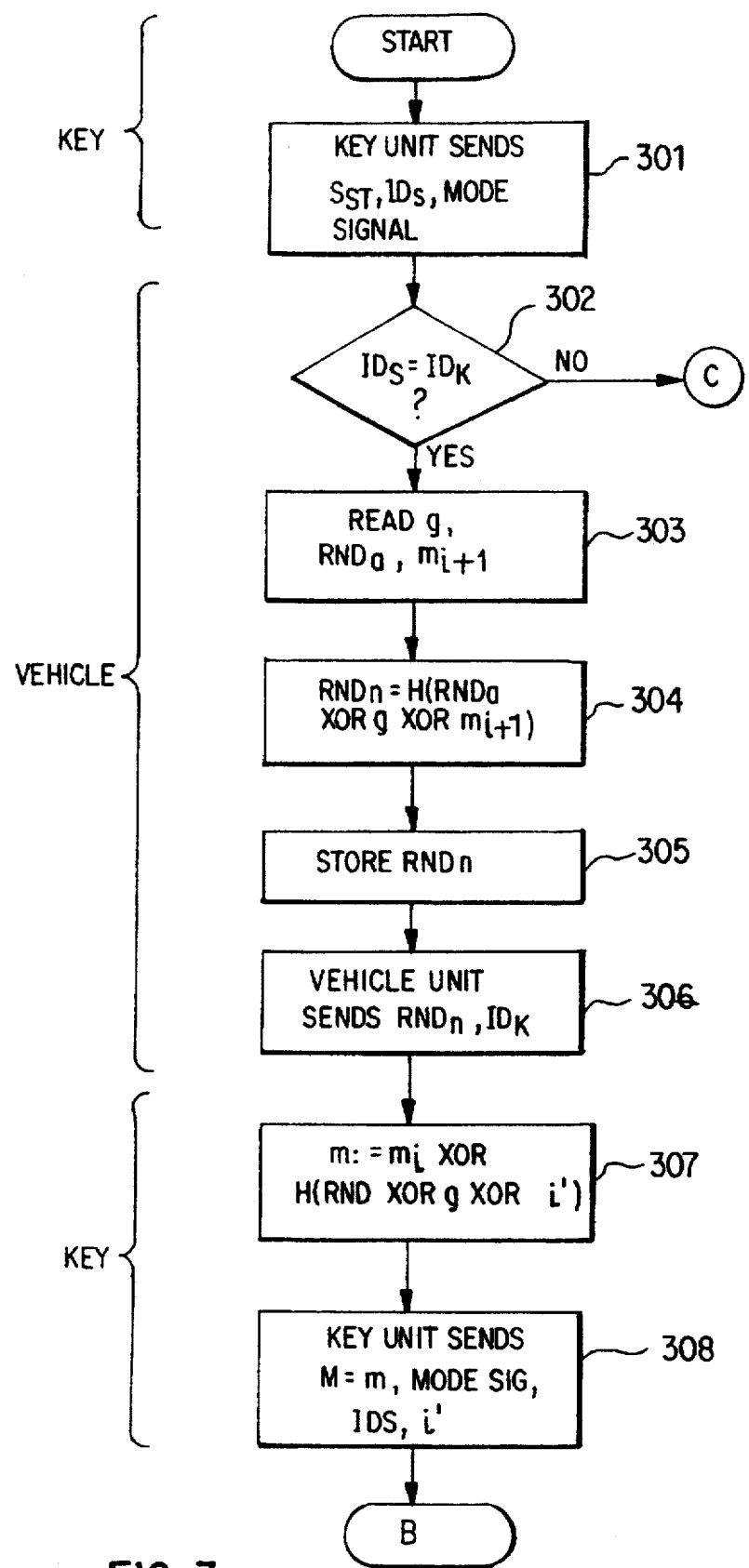
FIGS. 3a and 3b are flow charts which illustrate the overall authentication process performed by the authentication apparatus of FIG. 1.
Figure 3B:
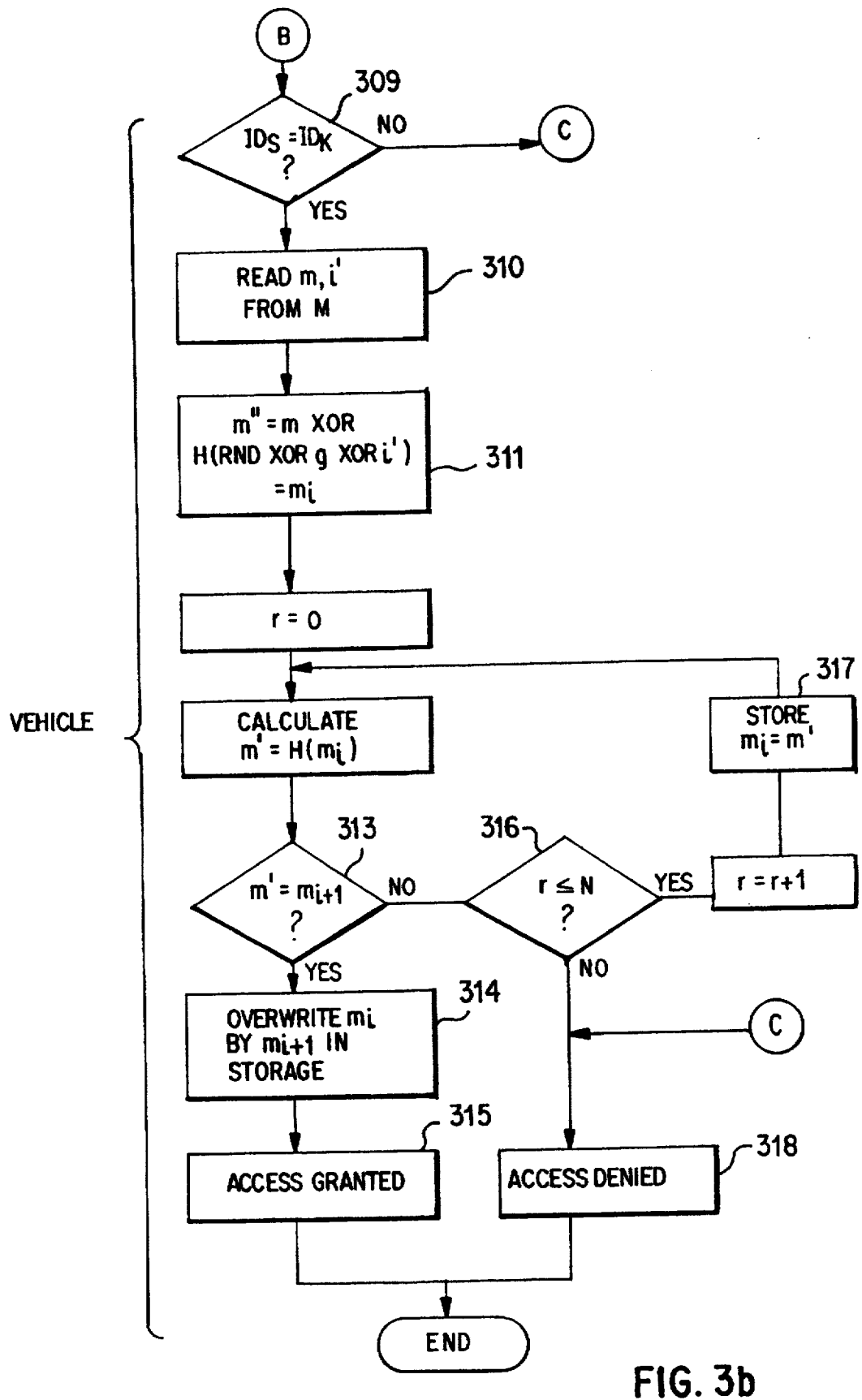

This completes the preparations for normal authentication operation with the vehicle security device. An authentication attempt, by which a user tries to demonstrate to the vehicle that he is authorized for use, permitting him to open the vehicle and deactivate the disabling facility which was set when the vehicle was parked, is initiated by actuating the starting button (6) of a key unit (1). As illustrated in FIG. 3, the starting signal ($S_{ST}$) which is generated in this manner is transmitted, together with the identification data ($ID_s$) and the mode signal (step 301) for normal authentication to the receiver (10) of the locking control (2) via the transmitter (5) and the transmission link (9). The identification data comparator (12) in the reception-end component (2') of locking control (2) detects an authentication attempt by means of the mode signal, and determines whether compatible hardware units are connected to one another (step 302).

If the comparison is positive, the comparator (12) enables the gate (29) to permit the starting signal ($S_{ST}$) to pass through to random information generator (24). (A timer for the reception of responsive random information (RND) is set with the emission of the starting information ($S_{ST}$) in the key unit (1), and the process is aborted so that no response message can be accepted after the waiting period has expired.) The random information generator (24) is actuated by the incoming starting signal ($S_{ST}$), and reads (step 303) the secret information (g) out of the memory (23), the last item of random information ($RND_a$) out of the memory (28) and the key unit-specific inverse image ($m_{i+1}$) which was transmitted during the last successful authentication out of the desired authorization information memory (16). From these inputs the random information generator (24) produces the new item of random information ($RND_n$) in accordance with the relation given above (step 304). In step 305 the new value is subsequently stored in the random information memory (28) and transmitted from there to the vehicle-end transmitter (25) from where it passes via the infrared transmission link (9) to the key unit (1) where it is received by the receiver (26) and fed to the coding unit (4) (step 306). When the random information (RND) is transmitted, an item of identification data information ($ID_K$) is also transmitted and a timer for detecting the reception of a response message is set, to protect against a possible attempt at manipulation using intercepted data by means of a manipulated, delayed starting instruction.

After reception of the random information (RND), the timer and the received identification data are tested at the key unit to determine i) whether the random information was actually emitted by the pertaining vehicle (comparison of identifier values), and ii) whether data message errors have occurred, for example, due to disturbances in the transmission path (for example, by parity test). If there are no errors, in step 307 the coding stage (4) generates the coded inverse image information (m), for which purpose the new counter value (i') and the next inverse image ($m_i$) are also input to it. This coded information (m), together with the mode signal (which is set to continue normal authentication), the identification data ($ID_s$) and the non-coded counter value (i'), are emitted as user code information (M) via the transmitter (5)(step 308).

After reception of the user code information (M) by the receiver (10), the identification data information ($ID_s$) is initially extracted from the user code information (M) in the locking control (2) and compared with the vehicle-end identification data ($ID_K$) in step 309. If a key (1) which is intended for the vehicle does not have the required hardware identity, the user code information (M) is prevented from being passed on to the CAN bus and from there to the other control device units by means of corresponding control information to the gate function block (13) and the authentication process is aborted without the vehicle being unlocked or the disabling facility being deactivated (step 318).

If, however, the necessary hardware identity is detected, the mode signal is subsequently interrogated as to whether the continuation of a normal authentication process lies within the set time period. If so, in step 310, the non-coded counter value (i') and the coded inverse image information (m) are extracted from the user code information (M) and fed to the decoding stage (22). The latter determines the inverse image information (m") contained in the received user code information (M), using the additional input secret information (g) and the instantaneous random information (RND), by means of the decoding relation given (step 311).

This information is then transmitted via the CAN bus to all control devices (2) involved in the operation, where it is passed on to the respective units (14) for generating hash function values, and to the gate (15). Of course, when there is a positive authentication, this decoded inverse image information (m") corresponds to the information ($m_i$) fed into the coding stage (4).

The unit (14) calculates the hash function value (m') associated with the fed-in inverse image (m") and passes it on as actual authorization information (m') to the comparator (17) and to the second gate (18). In the meantime, the associated key number ($ID_j$) is determined by means of the identification data ($ID_s$) contained in the user code information (M), and the value ($m_{i+1}$) stored in the associated memory location of the desired authorization information memory (16) is read out to the other input of the comparator (17). This value ($m_{i+1}$) corresponds to the inverse image information which is fed to the control device (2) during the last preceding authentication to be carried out successfully with this key unit (1). (It is important to note in this regard that the inverse image $m_0, \ldots, m_{n-1}$ stored in the memory 3 are read out in reverse order. Thus, application of the hash function to a particular stored value $m_i$ yields the previously transmitted value $m_{i+1}$.)

If the comparator (17) detects correspondence of the actual and desired authorization information (m'=H(m")=H($m_i$)=$m_{i+1}$) in step 313, it generates the use-enabling signal ($S_F$) which on the one hand triggers, as a control signal fed back to the gate (15), the overwriting of the respective memory location with the inverse image ($m_i$) fed during this authentication, (step 314) and on the other hand brings about, together with the use-enabling information generated simultaneously in the other control devices involved in the process, the entire deactivation of the electronic disabling facility, so that all the control devices are returned to their operative state (step 315).

If memory space is to be saved in some of the pieces of equipment, there may be provision to store only a portion (e.g. 2 bytes) of the entire desired authorization information ($m_{i+1}$) in the said pieces of equipment, and to compare only this portion with the corresponding portion of the hash function value (m') in the comparator block (17). So that, nevertheless, incorrect deactivation of the disabling facility can be prevented (which could otherwise occur because of the reduced comparison, particularly with a large capture range), the complete code comparison is retained for at least one piece of equipment, e.g. the locking control device. The result of this code comparison is transmitted to the devices with abbreviated comparison, and the generation there of the use-enabling information is associated with the presence of a positive result of the complete code comparison.

On the other hand, if the comparator function block (17) detects non-correspondence, (provided that the number of successive non-correspondences has not yet exceeded the capture range by a number (N) of possible repetitions) it transmits a non-correspondence signal ($N_u$) to the gate (18) which in response stores the hash function value (m') generated at the output (step 317), back to the input side of the unit (14) which generates hash function values. The latter then carries out a renewed formation of hash function values using this input value (m'), the result of which is then transmitted to the comparator (17) as new actual authorization information. This recursive generation of hash function values is continued until either the comparator (17) detects correspondence of one of the successively generated items of actual authorization information with the desired authorization information ($m_{i+1}$) present (after which, as stated above, generation is continued), or the loop repetition number(1) has reached the maximum number (N) (e.g. N=100,000) prescribed by the capture range (step 316). In the latter case, the authentication process is aborted as unauthorized while the disabling facility continues to be activated (step 318), or a new item of user code information with correct identification data arrives, so that the loop counter is reset and the generation of hash function values is continued with the newly transmitted inverse image.

As already stated in brief above, the capture range permits restoration of synchronization of the key and vehicle units which have become out of step as a result of a single or multiple actuation of the key without reception by the vehicle for the associated transmission protocol. That is, the vehicle unit is readjusted to the inverse image which is now present in the key (1) by means of correspondingly frequent, successive formation of hash function values within the capture range. If the capture range (N) is selected to be exactly as large as the power (n) of the sequence of inverse images, the synchronization for an authorizing key can always be restored.

By virtue of the property, typical for hash function values, that the function values are assumed to be distributed with virtually identical probability over the entire value range, and by virtue of the fact that even when a reduced algorithm with 8-byte values is used, approximately $10^{20}$ function values are possible, it is extremely improbable, even with a capture range of $N=10^5$ that an unauthorized person, if he were to somehow overcome the identification test, would achieve positive authentication by transmitting inverse function values on a trial and error basis using the capture range. Moreover, it is possible to prevent such frequent attempts by means of a corresponding time window or limit on the number of attempts within which an authorizing authentication would have to take place, while otherwise the vehicle would continue to be disabled in response to further authentication attempts. It is possible for such disablement to be cancelled for example only by the vehicle manufacturer via the diagnostic interface (19). Of course, the mode of operation of the vehicle security device proceeds in an analogous fashion for any other authentication process desired for the said device or for other key units as described above.

The selection of the capture range (N=n) such that it is equal to the power of the inverse image sequence (n) also provides a very convenient way of producing a replacement key. As mentioned above, the inverse starting value ($m_0$) was generated at the key manufacturer's plant (SH) by the repeated formation of hash function values from a key-specific initial random value ($r_0$) (for example, by application T-times, i.e. $m_0 = H^T(r_0)$ where for example T=400,000). If a replacement key is to be provided, it is initialized at the key manufacturer's plant (SH), as was the original key, with the exception that the value $m_0' = H^{T-N}(r_0)$ is selected starting from the same initial random value ($r_0$) as inverse starting value ($m_0'$).

Now, an authentication dialogue with the vehicle is carried out using this replacement key. The replacement key firstly transmits the value $x = H(m'_{n-1}) = H^{n-1}(m_0) = H^{T-r}(r_0)$ to the vehicle. However, this value lies with certainty in the capture range of the vehicle unit since it follows from this that $H^N(x) = H^{T+N-1}(r_0) = H^{N-1}(m_0)$. The replacement key is automatically interpreted by the first authentication dialogue via the capture range as an authorizing key, so that the instantaneously transmitted value (X) is simultaneously transferred into the vehicle-end desired authorization information memory (16). This in turn simultaneously makes the original key automatically invalid since its values lie with certainty outside the capture range of the new inverse image (x). A separate disabling process for the original key which has for example been lost is therefore unnecessary.

With this procedure, a number T/N of replacement keys can be successively authenticated. For example, when T=400,000 and N=100,000 four keys having the same key number can be replaced one after the other whenever n (the number of actuations) reaches 100,000. Of course, depending on the requirements, an alternative way of obtaining replacement keys in this field can be realized by using an additional known encryption method, for example, the asymmetrical Rivest-Shamir-Adleman ("RSA") algorithm known in cryptography (described in U.S. Patent No. 4,405, 829 entitled, "Cryptographic Communications Systems and Method," which is incorporated herein by reference, and is also discussed in R. L. Rivest, A. Shamir and L. Adleman, "A Method for Obtaining Digital Signature and Public Key Cryptosystems," Communications of the ACM, Vol. 21, pp. 120–126 (1978)) or the symmetrical DES (data encryption standard) method, especially if the capture range is selected to be smaller than the power of the inverse image sequence, so that the above technique for obtaining replacement keys is not possible. Furthermore, replacement keys may be obtained as a special function by means of the diagnostic interface and the special function memory (20).

The security of the system with respect to unauthorized authentication is provided in particular by the following points. A would-be thief cannot predict the next random information (RND) since the input values ($RND_a$) and (mi+1) for the unit (24) which generates random information are not repeated in a predictable way.

The hash function value generated in the coding stage (4) for the production of a correct authentication message cannot be calculated by a would-be thief without the key unit (1) since the secret information (g) is included in the calculation. Even if a would-be thief has a key unit (1), he cannot determine this coding hash function value without contact with the vehicle as long as the random information (RND) is not received by the vehicle. Because of the virtual irreversibility of the hash function, it is not possible for a would-be thief to detect the secret information (g) from intercepted starting information or authentication information. Consequently, there is no better option for a would-be thief than to guess the authentication message within the time window prescribed by the vehicle-end timer after the transmission of an item of random information, which is extremely improbable with a message length of 8 bytes. In particular, earlier intercepted authentication messages are of no help in this regard.

Thus, the system prevents unauthorized authentications by falsifying authentication messages, or feeding in earlier, intercepted authentication messages. Because of the existence of the timers for inputting response messages the system is also reliably protected against an action of the type mentioned at the beginning in which an unauthorized person makes illegitimate use of a key unit which has been temporarily handed over to him by intercepting an authentication message, stopping the authentication process, then returning the key unit to the authorized user and at a later time transmitting the authentication response to the vehicle. Therefore, in order to override the present system, considerable technical outlay and a high degree of specialized knowledge would be necessary on the part of a potential thief while the system is secure against other kinds of actions.

Consequently, the vehicle security device shown provides security against unauthorized use of a vehicle by third parties with a relatively low degree of complexity, and nevertheless a very high degree of protection. The security arrangement requires secret code information to be stored in a protected way at the vehicle unit in only one piece of equipment, which permits a plurality of further vehicle devices to be included without logistical security problems. Specifically, 64 bits are sufficient for the hash function code, and therefore the transmission time and the computational outlay are significantly lower than using the RSA method which is also conceivable and, as an asymmetrical encryption method, also only requires an item of secret information to be stored at one end, but has a high word length of 512 bits and thus, in view of the computational capacities present in a vehicle, requires relatively long computing and transmission times.

It is apparent that only the units and operations which are essential for the invention have been mentioned in the above example and further, customary units and operational sequences are additionally provided, and that the person skilled in the art is capable of forming, within the scope of the invention, a plurality of modifications of this embodiment, for example using another one-way function, application-specific changes to the concretely specified numerical examples, dispensing with the identification test and/or the special function facility or using a chip card system instead of the infrared signal transmission. Additionally, it is of course possible for a different random generator and/or a different logic linking code in the coding stage to be provided. Finally, as a variant it is also possible to dispense with the provision of an item of secret information to be carried at the vehicle unit, which provides a somewhat reduced level of code security.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle security device having an electronic use-authorization coding arrangement comprising:

a user-end key unit for receiving an item of random information, and for subsequently transmitting an item of user code information which is dependent thereon;

a vehicle-end apparatus for transmitting said item of random information, for subsequently receiving a transmitted item of user code information, and for determining an item of actual authorization information which is dependent on the item of user code information; and means for comparing said item of actual authorization information with an item of desired authorization information present at the vehicle unit, and for generating an item of use-enabling information based on a result of said comparing, wherein:

successively transmitted items of user code information contain changing inverse images calculated by means of a one-way function, which inverse images are logic linked in coded form to the item of random information;

the vehicle end apparatus includes means for extracting inverse image information from an item of received user code information;

the desired authorization information is in each case a one-way function value of the inverse image contained in an associated item of user code information; and determination of the actual authorization information from the received user code information includes the formation of a one-way function value of the inverse image contained in the received user code information.

2. Vehicle security device according to claim 1 wherein:

successively transmitted inverse images constitute a sequence generated from repeated application of the one-way function, said inverse images being used in reverse order relative to a sequence in which they were generated; and the desired authorization information consists in each case of an inverse image which was transmitted with the user code information during a last preceding successful use-authorization testing process using a particular key unit.

3. Vehicle security device according to claim 2 wherein selected elements of said sequence are stored as samples, and a subsequence between two samples is stored, in an inverse image memory of the key unit, another subsequence being generated and stored in place of a previous one, at least when a last remaining inverse image of the previous subsequence has been transmitted.

4. Vehicle security device according to claim 2 wherein an item of new actual authorization information is determined as a one-way function value of a next preceding actual authorization information after a negative result of a comparison of actual authorization information and desired authorization information, said item of new actual authorization information being compared in each case with the desired authorization information for a prescribed maximum number of repetitions.

5. Vehicle security device according to claim 2 further comprising replacement key units which can be used successively in place of a previous key unit, inverse images of one replacement key unit forming a subsequence, which directly precedes an inverse image subsequence of the preceding key unit, out of an entire sequence which is generated by repeated calculation of one-way function values starting from a starting value which is stored centrally on a key number-specific basis.

6. Vehicle security device according to claim 1 wherein a cryptographic hash function is used as a one-way function.

7. Vehicle security device according to claim 6 wherein said hash function is the RIPEMD function.

8. Vehicle security device according to claim 1 wherein a plurality of vehicle-end pieces of equipment are arranged in parallel to determine the respective actual authorization information from an item of received user code information, to compare the actual authorization information with the desired authorization information, and to generate, as a function of the comparison, an item of use-enabling information.

9. Vehicle security device according to claim 1 wherein a locking control device of the vehicle forms a vehicle-end piece of equipment of the security device.

10. Vehicle security device according to claim 1 wherein:

respective transmitted user code information contains an item of vehicle-specific and an item of key-specific identification information; and the identification information of an item of received user code information can be evaluated in advance in a vehicle-end piece of equipment, the use-authorization testing process being aborted after non-authorizing transmitted identification data are detected.

11. Vehicle security device according to claim 1 wherein:

a plurality of authorizing, user-end key units are provided for a vehicle, which key units transmit different inverse image sequences;

each item of transmitted user code information contains an item of key identification information; and an item of specific desired authorization information is stored in, and readable out of, a memory, which can be addressed with the aid of the key identification information, in each vehicle-end piece of equipment involved in the process for each key unit.

12. Vehicle security device according to claim 1 wherein the means for extracting the inverse image information from an item of received user code information, means for producing an item of random information, a transmitter, and a receiver are arranged at the vehicle end in a single piece of equipment, which has data-exchanging connections with other pieces of equipment.

13. Vehicle security device according to claim 1 wherein:

an item of secret information is stored in each key unit and in a selected piece of equipment; and inverse image information is logic linked in coded form to the random information using the relation $$m_i \text{ XOR } H(RND \text{ XOR } g \text{ XOR } i')$$

$m_i$ being an ith item of inverse image information, RND being an item of random information, g being a stored item of secret information, H being a hash function, and i' being a counter value which changes for each authentication attempt.

14. Vehicle security device according to claim 13 wherein in each case a new item of random information is formed using the relation $$RND_n = H(RND_a \text{ XOR } g \text{ XOR } m_{i+1})$$

wherein $RND_n$ is a current item of random information, $RND_a$ is a next preceding item of random information, and $m_{i+1}$ is a next preceding item of inverse image information.

* * * * *